US010352316B2

(12) United States Patent
Giera et al.

(10) Patent No.: US 10,352,316 B2
(45) Date of Patent: Jul. 16, 2019

(54) SYSTEMS AND METHODS FOR EVALUATING FUEL PUMP DATA

(71) Applicant: NCR Corporation, Duluth, GA (US)

(72) Inventors: Steven Giera, Dacula, GA (US); John DeSetto, Cumming, GA (US); Joel Miller, Sandy Springs, GA (US)

(73) Assignee: NCR Corporation, Atlanta, GA (US)

( * ) Notice: Subject to any disclaimer, the term of this patent is extended or adjusted under 35 U.S.C. 154(b) by 252 days.

(21) Appl. No.: 13/864,365

(22) Filed: Apr. 17, 2013

(65) Prior Publication Data

US 2014/0316588 A1 Oct. 23, 2014

(51) Int. Cl.

| | |
|---|---|
| ***G05D 7/06*** | (2006.01) |
| ***F04B 49/06*** | (2006.01) |
| *B67D 7/04* | (2010.01) |
| *B67D 7/08* | (2010.01) |
| *B67D 7/14* | (2010.01) |

(52) U.S. Cl.

CPC .............. *F04B 49/065* (2013.01); *B67D 7/04* (2013.01); *B67D 7/085* (2013.01); *B67D 7/14* (2013.01); *F04B 2205/09* (2013.01); *F04B 2207/70* (2013.01)

(58) Field of Classification Search

CPC .......... G01F 1/00; F04B 49/065; F04B 49/00; F04B 2207/70; F04B 2205/09; B67D 7/14; B67D 7/085; B67D 7/04

USPC .......................................................... 700/282

See application file for complete search history.

(56) References Cited

U.S. PATENT DOCUMENTS

| | | | | |
|---|---|---|---|---|
| 6,421,616 | B1 * | 7/2002 | Dickson | 702/45 |
| 6,449,567 | B1 * | 9/2002 | Desai | G01R 31/343 318/490 |
| 7,574,385 | B2 * | 8/2009 | Hillam et al. | 705/28 |
| 2005/0087558 | A1 * | 4/2005 | Reichler et al. | 222/251 |
| 2005/0102112 | A1 * | 5/2005 | Reichler et al. | 702/45 |
| 2005/0159905 | A1 * | 7/2005 | Bond | G01F 15/063 702/51 |
| 2005/0267402 | A1 * | 12/2005 | Stewart et al. | 604/65 |
| 2006/0161374 | A1 * | 7/2006 | Hillam | G01F 15/063 702/130 |
| 2006/0162420 | A1 * | 7/2006 | Pappas | G01N 19/02 73/9 |
| 2009/0237073 | A1 * | 9/2009 | Uchiyama | A61B 1/00147 324/207.11 |
| 2011/0040503 | A1 * | 2/2011 | Rogers | B67D 7/222 702/55 |
| 2011/0132328 | A1 * | 6/2011 | Attwood et al. | 123/456 |
| 2011/0191037 | A1 * | 8/2011 | Oldham et al. | 702/45 |

(Continued)

*Primary Examiner* — Thomas C Lee
*Assistant Examiner* — Alan Chu
(74) *Attorney, Agent, or Firm* — Schwegman, Lundberg & Woessner

(57) ABSTRACT

Various methods are described for evaluating fuel pump data and determining a fuel pump flow rate. One example method may comprise receiving fuel pump information associated with a fuel pump. The method may further comprise updating previous fuel pump information associated with the fuel pump based on the received fuel pump information. Additionally, the method may comprise detecting an alarm condition associated with the fuel pump based at least in part on the updated fuel pump information. Similar and related methods, apparatuses, and computer program products are also provided.

20 Claims, 4 Drawing Sheets

(56) References Cited

U.S. PATENT DOCUMENTS

| | | | | |
|---|---|---|---|---|
| 2011/0232585 | A1* | 9/2011 | Rich et al. | 119/721 |
| 2012/0123288 | A1* | 5/2012 | Van Kesteren | A61B 5/082 600/532 |

* cited by examiner

SYSTEMS AND METHODS FOR EVALUATING FUEL PUMP DATA

BACKGROUND OF THE INVENTION

The self-service industry continues to grow as customers become savvier with technology. One particular area of self-service that is growing rapidly is the use of self-service fuel pumps at gas stations. These fuel pumps may be equipped to dispense fuel and accept payment for the fuel, thereby allowing a customer to complete and pay for a fuel transaction without ever needing to enter the store.

Due to the self-service customer's reliance on the fuel pump and its associated functionality, it is critical that fuel providers maintain efficient and functional fuel pumps to ensure high customer satisfaction and convenience. However, many issues may arise with respect to a fuel pump and its functionality that may not be immediately detectable to a fuel provider. For example, a fuel pump may be suffering from a reduced rate of fuel output, or issues may arise with respect to the payment hardware and/or software. As a result, a fuel provider may not be equipped to detect and resolve such issues rapidly, and customer satisfaction may suffer.

Accordingly, it may be desirable to provide systems, methods, apparatuses, and computer program products for evaluating fuel pump data that avoid the above, and other, drawbacks associated with the current art.

BRIEF SUMMARY OF THE INVENTION

Various embodiments of the present invention provide systems, methods, apparatuses, and computer program products for evaluating fuel pump data. An example method for evaluating fuel pump data may comprise receiving fuel pump information associated with a fuel pump; updating previous fuel pump information associated with the fuel pump based on the received fuel pump information; and detecting, via a processor, an alarm condition associated with the fuel pump based at least in part on the updated fuel pump information.

In an example embodiment, the fuel pump information may comprise information selected from the group consisting of fuel pump flow rate, fuel transaction cancellations, help button presses, card read errors, and printer errors.

In another example embodiment, the previous fuel pump information may comprise an average value of previously received fuel pump information associated with the fuel pump, and updating the previous fuel pump information may comprise updating the average value with the received fuel pump information.

In yet another example embodiment, the alarm condition may indicate a condition selected from the group consisting of the average value exceeding a threshold and the average value falling below a threshold.

In an example embodiment, the previous fuel pump information may comprise a combined value of previously received fuel pump information associated with the fuel pump, and updating the previous fuel pump information may comprise updating the combined value with the received fuel pump information.

In another example embodiment, the alarm condition may indicate that the combined value exceeds a maximum acceptable value.

In still another example embodiment, the method may further comprise providing for transmission of an alert comprising an indication of the alarm condition.

In an example embodiment, the method may further comprise monitoring the elapsed time from transmission of the alert; and generating a second alarm condition in an instance in which the elapsed time exceeds a threshold and the alarm condition associated with the alert has not been resolved.

An example apparatus for evaluating fuel pump data may comprise at least one processor; and at least one memory comprising computer program code, the at least one memory and the computer program code configured to, with the at least one processor, cause the apparatus at least to: receive fuel pump information associated with a fuel pump; update previous fuel pump information associated with the fuel pump based on the received fuel pump information; and detect an alarm condition associated with the fuel pump based at least in part on the updated fuel pump information.

In an example embodiment, the fuel pump information may comprise information selected from the group consisting of fuel pump flow rate, fuel transaction cancellations, help button presses, card read errors, and printer errors.

In another example embodiment, the previous fuel pump information may comprise an average value of previously received fuel pump information associated with the fuel pump, and updating the previous fuel pump information may comprise updating the average value with the received fuel pump information.

In yet another example embodiment, the alarm condition may indicate a condition selected from the group consisting of the average value exceeding a threshold and the average value falling below a threshold.

In an example embodiment, the previous fuel pump information may comprise a combined value of previously received fuel pump information associated with the fuel pump, and updating the previous fuel pump information may comprise updating the combined value with the received fuel pump information.

In another example embodiment, the alarm condition may indicate that the combined value exceeds a maximum acceptable value.

In still another example embodiment, the at least one memory and the computer program code may be configured to, with the at least one processor, further cause the apparatus at least to provide for transmission of an alert comprising an indication of the alarm condition.

In an example embodiment, the at least one memory and the computer program code may be configured to, with the at least one processor, further cause the apparatus at least to monitor the elapsed time from transmission of the alert; and generate a second alarm condition in an instance in which the elapsed time exceeds a threshold and the alarm condition associated with the alert has not been resolved.

Another example method for determining a fuel pump flow rate may comprise receiving a first fuel volume update associated with a fuel transaction; receiving a second fuel volume update associated with the fuel transaction; determining an elapsed time between the first fuel volume update and the second fuel volume update; and determining, via a processor, a flow rate of the fuel pump based at least in part on the first and second fuel volume updates and the elapsed time.

In an example embodiment, the first fuel volume update may correspond to a fuel volume greater than a first fuel volume threshold.

In another example embodiment, the second fuel volume update may correspond to a fuel volume less than a second fuel volume threshold.

In yet another example embodiment, the method may further comprise receiving a third fuel volume update associated with the fuel transaction in an instance in which the second fuel volume update is determined to contain errant information; wherein determining the elapsed time may comprise determining the elapsed time between the first fuel volume update and the third fuel volume update, and wherein determining a flow rate of the fuel pump may comprise determining the flow rate of the fuel pump based at least in part on the first and third fuel volume updates and the elapsed time.

BRIEF DESCRIPTION OF THE DRAWINGS

Figure 1:
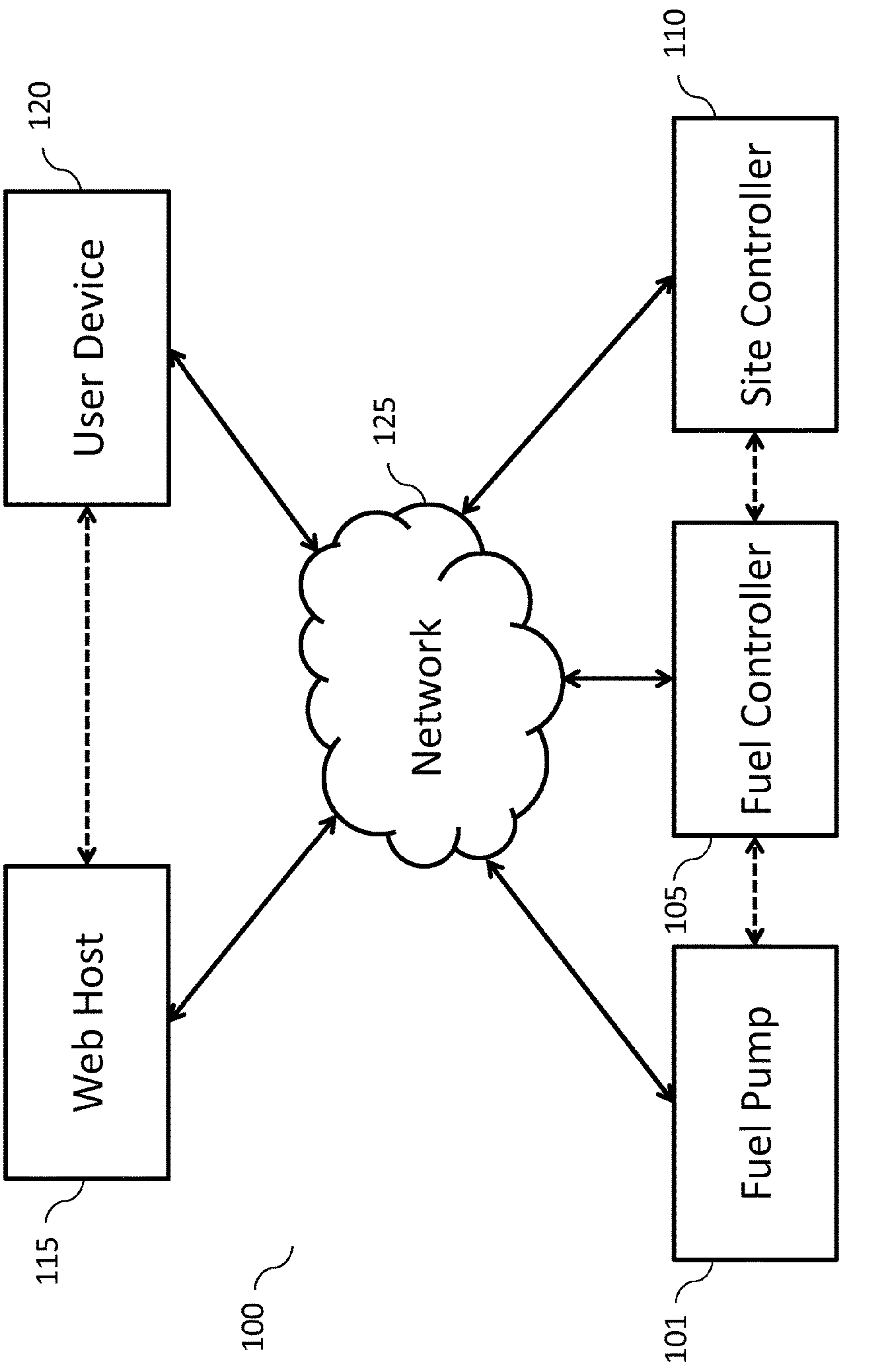

Having thus described the invention in general terms, reference will now be made to the accompanying drawings, which are not necessarily drawn to scale, and wherein:

FIG. 1 provides an illustration of one embodiment of an architecture that can be used to practice various aspects of the present invention.

Figure 2:
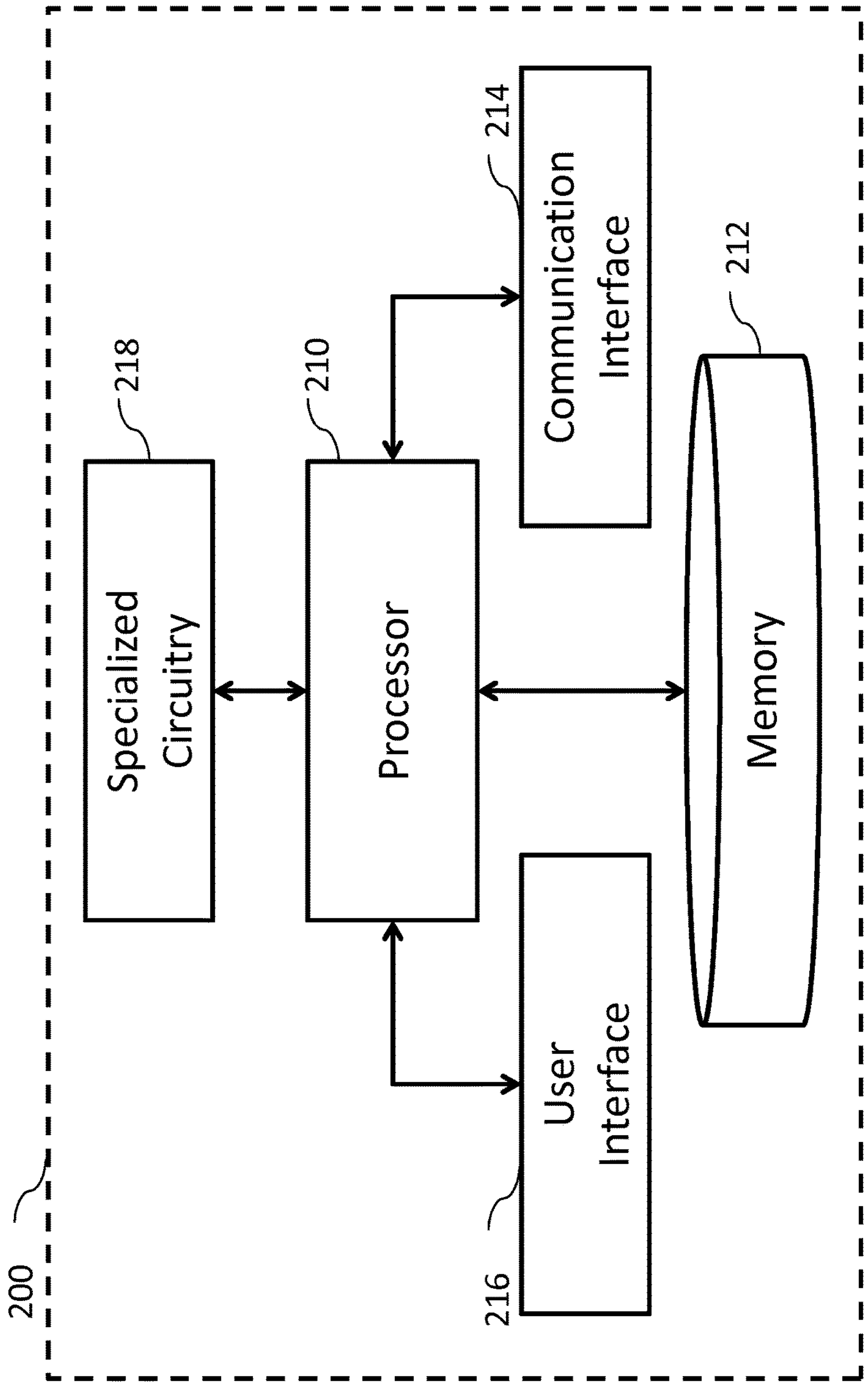

FIG. 2 provides a schematic diagram of a generic apparatus according to an embodiment of the present invention.

Figure 3:
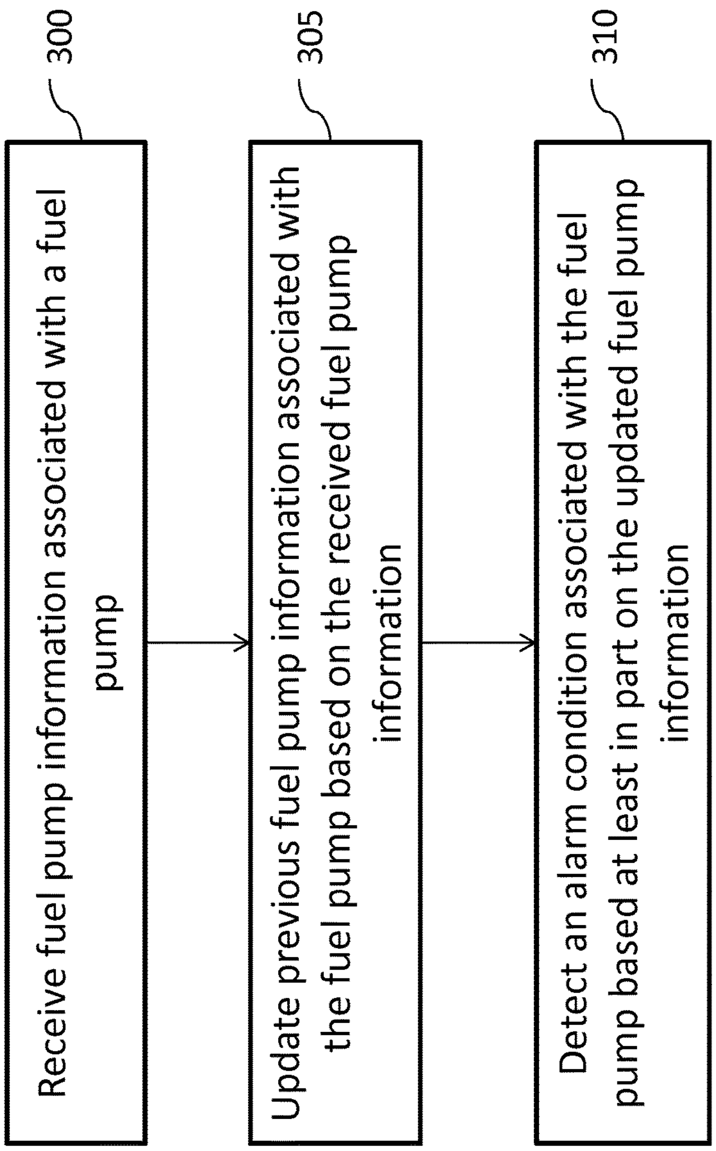

FIG. 3 provides a flowchart for evaluating fuel pump data from the perspective of a web host according to an embodiment of the present invention.

Figure 4:
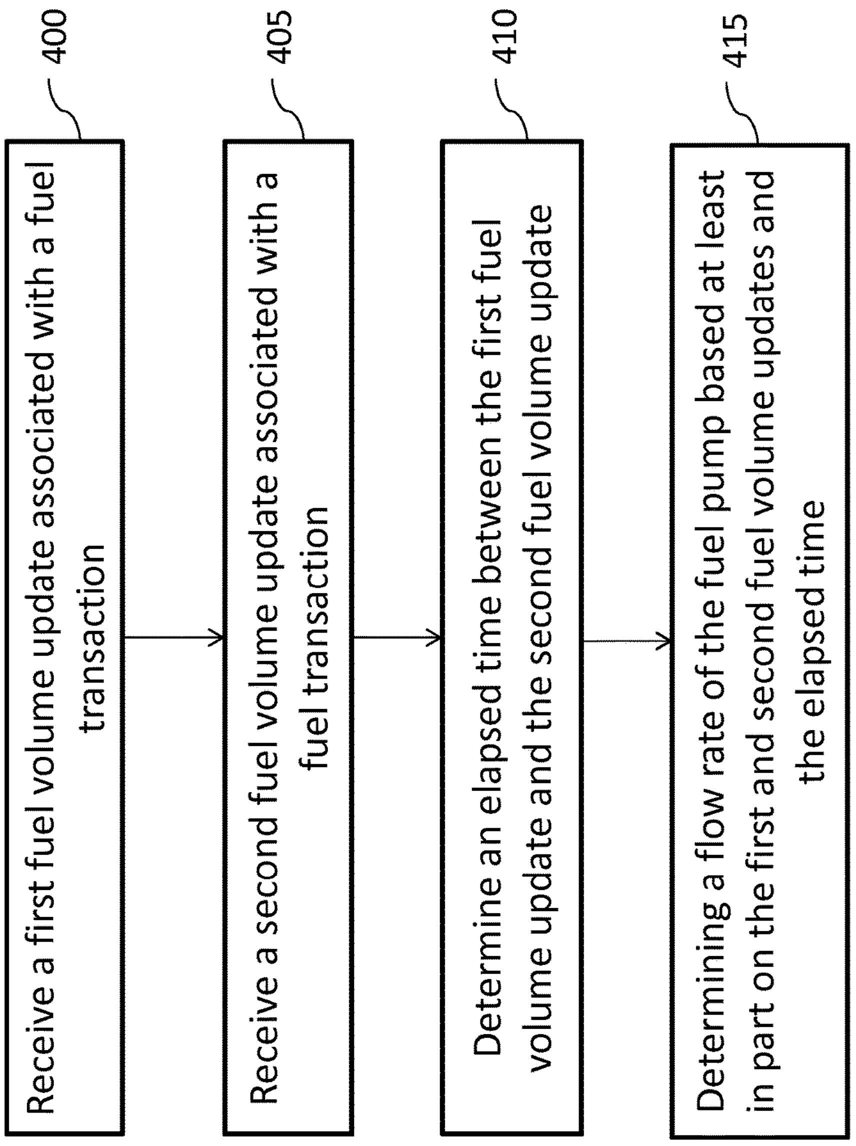

FIG. 4 provides a flowchart for determining a fuel pump flow rate from the perspective of a point-of-sale terminal according to an embodiment of the present invention.

DETAILED DESCRIPTION OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

FIG. 1 provides an illustration of a system 100 that can be used in conjunction with various embodiments of the present invention to evaluate fuel pump data. As shown in FIG. 1, the system 100 may comprise one or more fuel pumps 101. A fuel pump 101 may comprise hardware for delivering fuel to a customer and/or hardware for facilitating payment for the fuel at the fuel pump (e.g., a card reader, display, interface, and/or printer). The system 100 may further comprise one or more fuel controllers 105. A fuel controller 105 may be embodied as a point-of-sale terminal or a modified point-of-sale terminal providing additional functionality over a typical point-of-sale terminal, for instance functionality for interfacing with a fuel pump 101. Additionally, the system 100 may comprise one or more site controllers 110. A site controller 110 may be embodied as a point-of-sale terminal or a modified point-of-sale terminal providing additional functionality over a typical point-of-sale terminal, for instance functionality for interfacing between a fuel controller 105 and a web host 115. The system 100 may further comprise one or more web hosts 115. A web host may be embodied as a host, web server, cloud server, and/or the like. Furthermore, the system 100 may comprise one or more user devices 120. For instance, a user device 120 may be embodied as a smartphone device, mobile telephone, mobile computer, portable digital assistant (PDA), laptop computer, desktop computer, gaming device, electronic tablet, or any other type of similar electronic device.

Each entity of the system 100 may be connected, directly or indirectly, to one or more other entities of the system 100 via one or more networks 125. A network 125 may be a wired and/or wireless network comprising one or more of a local area network, wide area network, cellular network, internet, or the like. In some instances, a fuel pump 101 may be configured to communicate directly with a fuel controller 105 and/or a site controller 110. In other instances, a fuel controller 105 may be configured to communicate directly with a site controller 110. In certain instances, a web host 115 may be configured to communicate directly with one or more user devices 120. It should be noted that other system architectures are contemplated that may be used to practice various aspects of the invention. Thus, the system 100 provided in FIG. 1 is for illustrative purposes only and should not be construed to limit the scope of the invention. Further, while FIG. 1 illustrates certain system entities as separate, standalone entities, the various embodiments are not limited to this particular architecture.

In various embodiments, a fuel pump 101, a fuel controller 105, a site controller 110, a web host 115, and/or a user device 120 may be embodied as or otherwise include an apparatus 200 as generically represented by the block diagram of FIG. 2. In the example embodiment, the apparatus 200 may comprise various means for performing the various functions herein described. These means may comprise one or more of a processor 210, memory 212, communication interface 214, user interface 216, or specialized circuitry 218. The various means may be in communication with one another, such as via a bus.

The means of the apparatus 200 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 212) that is executable by a suitably configured processing device (e.g., the processor 210), or some combination thereof. In some example embodiments, the processor 210, memory 212, communication interface 214, user interface 216, and/or specialized circuitry 218 may be embodied as a chip or chip set.

The processor 210 may, for example, be embodied as various means including circuitry, one or more microprocessors with accompanying digital signal processor(s), one or more processor(s) without an accompanying digital signal processor, one or more coprocessors, one or more multi-core processors, one or more controllers, one or more computers, various other processing elements including integrated circuits such as, for example, an ASIC (application specific integrated circuit) or FPGA (field programmable gate array), one or more other hardware processors, or some combination thereof. Although illustrated in FIG. 2 as a single processor, in some embodiments the processor 210 may comprise a plurality of processors. The plurality of processors may be in operative communication with each other and may be collectively configured to perform one or more functionalities of the apparatus 200 as described herein. The plurality of processors may be embodied on a single device or distributed across a plurality of devices collectively configured to function as the apparatus 200.

In some example embodiments, the processor 210 may be configured to execute instructions stored in the memory 212 or memory otherwise accessible to the processor 210. These instructions, when executed by the processor 210, may cause the apparatus 200 to perform one or more of the functionalities of the apparatus 200 as described herein. Further, the processor 210 may comprise functionality to operate one or more software programs, which may be stored in memory. For example, the processor 210 may be capable of operating a connectivity program, such as a web browser. The connectivity program may allow the apparatus 200 to transmit and receive web content, such as location-based content, according to a protocol, such as Wireless Application Protocol (WAP), hypertext transfer protocol (HTTP), and/or the like. The apparatus 200 may be capable of using protocol(s), such as Transmission Control Protocol/Internet Protocol (TCP/IP), to transmit and receive web content across the internet or other networks.

The memory 212 may comprise, for example, volatile memory, non-volatile memory, or some combination thereof. In this regard, the memory 212 may comprise one or more tangible and/or non-transitory computer-readable storage media that may include volatile and/or non-volatile memory. Although illustrated in FIG. 2 as a single memory, the memory 212 may comprise a plurality of memories. The plurality of memories may be embodied on a single device or may be distributed across a plurality of devices collectively configured to function as the apparatus 200. In various example embodiments, the memory 212 may comprise a magnetic storage device (e.g., hard disk), dynamic and/or static random access memory (RAM), read only memory (ROM), cache memory, flash memory, optical disc, subscriber identity module (SIM), removable user identity module (R-UIM), circuitry configured to store information, or some combination thereof. The memory 212 may be configured to store information, data, applications (e.g., software programs), instructions, and/or the like, in some instances for execution by the processor 210, for enabling the apparatus 200 to carry out various functions in accordance with various example embodiments.

The communication interface 214 may be embodied as any device or means embodied in circuitry, hardware, a computer program product comprising computer readable program instructions stored on a computer readable medium (for example, the memory 212) and executed by a processing device (for example, the processor 210), or a combination thereof that is configured to receive and/or transmit data from/to another computing device. The communication interface 214 may include, for example, an antenna, a transmitter, a receiver, a transceiver, and/or supporting hardware or software for enabling communications with one or more remote devices. The communication interface 214 may be configured to receive and/or transmit data using any protocol that may be used for communications between devices.

The user interface 216 may be in communication with the processor 210 to receive an indication of a user input and/or to provide an audible, visual, mechanical, or other output to a user. As such, the user interface 216 may include, for example, a keyboard, keypad, scanner, printer, mouse, joystick, display (e.g., touch screen display), microphone, speaker, and/or other input/output mechanisms. The processor 210 and/or user interface circuitry comprising the processor 210 may be configured to control one or more functions of the user interface 216 through computer program instructions (e.g., software and/or firmware) stored on memory (e.g., memory 212) accessible to the processor 210.

The specialized circuitry 218 may be embodied as various means, such as circuitry, hardware, a computer program product comprising computer readable program instructions stored on a computer readable medium (for example, the memory 212) and executed by a processing device (for example, the processor 210), or some combination thereof and, in some embodiments, is embodied as or otherwise controlled by the processor 210.

General Overview

One or more components of a fuel pump 101 may fail, require maintenance, or otherwise face issues that detract from the customer experience. For example, in a particular fuel pump 101, a fuel filter may need replacing or a card reader may fail. In some instances, certain activities and/or conditions may be monitored that may provide advance notice of a problematic condition. For example, a reduced flow rate of fuel may indicate that a filter needs replacing soon, or an increased number of card read errors may indicate that a card reader may soon fail.

Various embodiments of the present invention provide solutions for anticipating and resolving issues with a fuel pump 101 and its components, such as those described above. In this regard, some embodiments comprise polling the fuel pump 101 to request status information or other data, collectively fuel pump data. In some instances, the fuel pump data may already be received by the desired entity without requiring any further particular polling. The received fuel pump data, in example embodiments, may be aggregated and analyzed to assist with anticipating and resolving certain issues associated with the fuel pump 101. As a result, the negative effects of these issues may be reduced leading to an improved customer experience.

Detailed Embodiments

Turning to a more detailed description of a process for evaluating fuel pump data according to various embodiments of the present invention, a fuel controller may obtain fuel pump information from a fuel pump. The fuel controller may pass the fuel pump information to a web host, for example via a site controller. In some instances, the fuel controller may manipulate the fuel pump information prior to transferring it to the web host. The web host may aggregate and store the fuel pump information associated with a number of stores/locations, each having one or more fuel pumps. The web host may determine whether the aggregated data indicates an occurring, or likely to occur, issue with a particular fuel pump. If so, the web host may alert a user, for example via a message to a user device.

According to example embodiments, a fuel controller 105 may be configured to receive fuel pump information from a fuel pump 101. In this regard, a fuel pump 101 may make available certain data, for example via a protocol or interface. In some instances, the fuel controller 105 may poll the fuel pump or submit a request to the fuel pump 101 for the fuel pump information. The fuel pump information may be related to a status or an event associated with the fuel pump 101. For example, the fuel pump information may comprise information about a fuel transaction cancellation, a help button press, a card reader error or message, a printer error or message, a money/volume update related to fuel being dispensed, and/or the like. Some fuel pump information may comprise more specific information about certain events, for example the fuel transaction cancellation event may indicate a reason for the cancellation.

In some embodiments, the fuel controller 105 may be configured to manipulate the fuel pump information received from the fuel pump 101. For example, the fuel controller 105 may be configured to calculate a flow rate of fuel for a particular fuel pump 101, or even a particular fuel hose associated with a fuel pump 101 if the fuel pump 101 comprises more than one fuel hose. In this regard, the fuel pump information may comprise money/volume information. That is, the money/volume information may indicate the current amount of fuel that has been dispensed thus far in a fuel transaction along with its current cost. The fuel controller 105 may receive multiple money/volume updates (e.g., five updates per second) per fuel transaction while the fuel is being dispensed. The fuel controller 105 may further track the time of each update. In one example, the fuel controller 105 may comprise a time tracking device and timestamp each update as it is received from the fuel pump 101. In another example, the fuel pump information from the fuel pump 101 may include a time stamp.

The fuel controller 105 may be configured to use the received money/volume information to calculate the flow rate. For example, the fuel controller 105 may determine the volume of fuel dispensed during a given time period and use that information to calculate the flow rate. In an example embodiment, the fuel controller 105 may determine the time that the volume reached a start point of the calculation (e.g., the first gallon or fourth liter) and the time that the volume reached an end point of the calculation (e.g., the third gallon or twelfth liter), determine the elapsed time between the start and end points, and divide the volume dispensed over that time period (e.g., two gallons or eight liters) by the total time.

In some embodiments, the fuel controller 105 may sample a portion of the fuel transaction, rather than using money/volume information from the entire transaction, to determine the flow rate. For example, the fuel controller 105 may qualify or ignore an initial portion of a fuel transaction (e.g., the first gallon or first four liters) when the flow rate is ramping up, and/or the fuel controller 105 may qualify or ignore an end portion of the fuel transaction (e.g., anything after the third gallon or twelfth liter) when the flow rate could potentially be ramping down. The fuel controller 105 may qualify or ignore entire transactions that may not provide accurate data. For example, the fuel controller 105 may qualify or ignore any fuel transaction for less than a predetermined threshold of volume (e.g., any transaction for less than five gallons or twenty liters) when the transaction may be for small containers where a full flow rate is never achieved. The fuel controller 105 may qualify or ignore other potentially inaccurate data. For example, the fuel controller 105 may qualify or ignore data representing likely incorrect information, such as an unusually or improbably high or low overall flow rate or an unusually or improbably high or low acceleration from one money/volume data point to the next money/volume information data point. In these embodiments, qualifying the data may comprise flagging the data as errant or atypical to enable the fuel controller 105, site controller 110, or web host 115 to determine alarm conditions based at least in part on the qualified data.

The fuel controller 105 may be configured to provide for transmission of the received and/or manipulated fuel pump information to one or more site controllers 110. In this regard, the site controller 110 may be configured to receive the fuel pump information from the fuel controller 105, and in some instances from multiple fuel controllers 105. The fuel controller 105 may be configured to provide the fuel pump information to the site controller 110 on a regular basis, such as promptly after receiving and/or manipulating the fuel pump information.

The site controller 110 may be configured to cache and/or store the received fuel pump information from the fuel controller 105. The site controller 110 may be configured to provide for transmission of the received fuel pump information from the fuel controller 105 to a web host 115. In this regard, the site controller 110 may transmit to the web host 115 an update containing all fuel pump information received from the fuel controller 105 since the previous update to the web host 115. The updates from the site controller 110 may be transmitted on a periodic basis (e.g., every 5-15 minutes). In some instances the update from the site controller 110 to the web host 115 may be less frequent than the updates from the fuel controller 105 to the site controller 110. The site controller 110 may store fuel pump information transmitted in previous updates to a web host 115 as well as fuel pump information not yet transmitted to the web host 115.

In certain embodiments, the site controller 110 may be optional to the system 100. That is, the fuel controller 105 may be configured to perform all of the functionality of the fuel controller 105 as well as all of the functionality of the site controller 110. In other embodiments, the fuel controller 105 may be optional to the system. That is, the site controller 110 may be configured to perform all of the functionality of the site controller 110 as well as all of the functionality of the fuel controller 105.

According to example embodiments, the web host 115 may be configured to receive original and/or manipulated fuel pump information from one or more site controllers 110 and/or, in certain instances, from one or more fuel controllers 105. In this regard, the web host 115 may be configured to receive fuel pump information from site controllers 110 and/or fuel controllers 105 at different locations (e.g., from different stores or gas stations). The web host 115 may be configured to collect and aggregate the received fuel pump information. For example, the web host 115 may be configured to maintain a database that stores the aggregated data. The aggregated data may be stored by the web host 115 on a per location, per fuel pump 101, and/or per hose basis.

The web host 115 may be configured to perform calculations and/or analysis on the aggregated fuel pump information. In some embodiments, the web host 115 may calculate and maintain a value representative of the aggregated data, such as averages, standard deviations, and/or the like. For example, the web host 115 may determine the average flow rate per fuel pump or fuel hose. In this regard, the web host 115 may update the flow rate average for a particular fuel pump 101 each time a new flow rate value for that fuel pump 101 is received from the site controller 110. In another example, the web host 115 may calculate an average number of card read errors for a particular fuel pump 101. In these examples, the web host 115 may further calculate and maintain standard deviations from the calculated averages. The averages may be calculated on a per transaction basis (e.g., card read errors per number of transactions), on a per time basis (e.g., printer offline time for a certain period of time).

According to various embodiments, the web host 115 may be configured to provide the aggregated fuel pump information to a user device 120. In some instances, the user device 120 may be associated with a particular location (e.g., store, gas station) or a user associated with that location. In this regard, the web host 115 may be configured to provide to the particular user device 120 the aggregated data related to the associated location, such as the one or more fuel pumps 101 at that location. The web host 115 may update the user device 120 with the relevant data on a periodic basis (e.g., every minute, hour, day). The web host 115 may configure the data sent to the user device 120 in a user friendly format prior to transmission, or the user device 120 may configure the data received from the web host 115 in a user friendly format. The user device 120 may provide for display of the received data to an end user.

The web host 115 may be configured to detect an alarm condition based at least in part on the data received. An alarm condition, in some instances, may indicate that a representative value (e.g., a calculated average or total) calculated and/or maintained by the web host 115 is above or below a threshold. The threshold may indicate a minimum or maximum acceptable value for a given representative value. In some instances, the threshold may be predetermined, for example by pre-configuration, by user input, based on historical and/or expected data, by a calculation, or the like. The web host 115 may be configured to check for such an alarm condition on a periodic basis. For example, the web host 115 may check for an alarm condition each time fuel pump information is received from a site controller 110, after each new calculation, or at a fixed time interval (e.g., once per minute).

In an example embodiment, the alarm condition may be triggered if an average number of events per time period exceeds a threshold number of events per time period. For example, the web host 115 may detect that the average number of card read errors, help button presses, fuel transaction cancellations, or the like exceeds an acceptable amount of such errors, presses, or cancellations for a particular fuel pump 101 per time period (e.g., per hour), thereby indicating an issue requiring service or other action. In some instances, the data may indicate a reason for each fuel transaction cancellation, and the alarm condition may be based on the subset of fuel transaction cancellations for a particular reason. In other example embodiments, the alarm condition may be triggered if a total number of events exceeds a maximum acceptable number of such events. For example, the web host 115 may detect that the total number of card read errors for the lifetime of a card reader at a particular fuel pump 101 exceeds a threshold for such errors, thereby indicating that the card reader should be replaced. In yet other example embodiment, the alarm condition may be triggered if an average value drops below an acceptable threshold value. For example, the web host 115 may detect that the average flow rate for a particular fuel pump 101 is less than an acceptable threshold, thereby indicating that the filter for the fuel pump 101 should be replaced. In other example embodiments, the alarm condition may be triggered if a certain amount of time has elapsed since a previous alarm condition without the previous alarm condition being remedied. For example, the web host 115 may detect that a printer error still exists after the elapsed time since the printer error was detected exceeds a threshold time for resolving the printer error. In various embodiments, triggering of the alarm condition may be based on single piece of fuel pump information received from the site controller 110 rather than the data aggregated and/or calculated by the web host 115. For example, the web host 115 may detect an alarm condition triggered by fuel pump information indicating a printer error, such as low paper, paper out, low ink, ink out, paper jam, offline, or the like. In certain instances, the acceptable error value may depend on the time of occurrence. For example, a printer offline for ten minutes may be acceptable in the middle of the night, whereas a printer offline may only be acceptable for five minutes in the middle of the day.

According to various embodiments, the web host 115 may be configured to generate an alert reporting the alarm condition. The web host 115 may provide the alert to a user, for example, via a user device 120. In this regard, the web host 115 may be configured to provide for transmission of a message containing the alert. In example embodiments, the web host 115 may send the message via a mobile app, web app, or any other application. In other embodiments, the web host 115 may send the message via email, text, push notification, phone, and/or the like. In an instance in which the web host 115 comprises a display, the web host 115 may be configured the present the alert via the web host 115 display.

In example embodiments, the user device 120 may be configured to receive an alert reporting an error condition. The user device 120 may be configured to display the alert to a user. For example, the user device 120 may execute an application (e.g., web browser, email client, stand-alone application) capable of receiving and displaying such an alert.

FIG. 3 provides a flowchart according to an example method for evaluating fuel pump data. The operations performed by a method, apparatus, and computer program product of this example embodiment are illustrated from the perspective of an apparatus 200 embodied as a web host 115. The apparatus 200 embodied by the web host 115 may comprise means, such as the specialization circuitry 218, the processor 210, or the like. In this example embodiment, the various operations may be performed by the specialized circuitry 218 embodied as fuel pump data evaluation circuitry. The method, apparatus, and computer program product for evaluating fuel pump data of one or more items to be purchased at a store may comprise receiving fuel pump information associated with a fuel pump at operation 300. At operation 305, the method, apparatus, and computer program product may comprise updating previous fuel pump information associated with the fuel pump based on the received fuel pump information. The method, apparatus, and computer program product may comprise detecting an alarm condition associated with the fuel pump based at least in part on the updated fuel pump information at operation 310.

FIG. 4 provides a flowchart according to an example method for determining fuel pump flow rate information. The operations performed by a method, apparatus, and computer program product of this example embodiment are illustrated from the perspective of an apparatus 200 embodied as a fuel controller 105, site controller 110, or more generally a point-of-sale terminal. The apparatus 200 embodied by the point-of-sale terminal may comprise means, such as the specialization circuitry 218, the processor 210, or the like. In this example embodiment, the various operations may be performed by the specialized circuitry 218 embodied as flow rate determination circuitry. The method, apparatus, and computer program product for determining fuel pump flow rate information may comprise receiving a first fuel volume update associated with a fuel transaction at operation 400. At operation 405, the method, apparatus, and computer program product may comprise receiving a second fuel volume update associated with the fuel transaction. The method, apparatus, and computer program product may comprise determining an elapsed time between the first fuel volume update and the second fuel volume update at operation 410. At operation 415, the method, apparatus, and computer program product may comprise determining a flow rate of the fuel pump based at least in part on the first and second fuel volume updates and the elapsed time.

FIGS. 3 and 4 illustrate a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 212) of an apparatus, server, or other computing device (e.g., apparatus 200) and executed by a processor (e.g., processor 210) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Execution of instructions associated with the operations of the flowchart by a processor, or storage of instructions associated with the blocks or operations of the flowchart in a computer-readable storage medium, supports combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

Numerous benefits may be realized from the implementation of embodiments of the present invention. In various advantageous embodiments, a user may be alerted to alarm conditions related to a fuel pump. In some instances, the alerts may be generated without requiring any further information than what is already provided by fuel pumps and at no greater frequency. For example, the alerts may be generated based on information already received due to current polling of the fuel pump. Example embodiments further provide advantages in monitoring the flow rate of a fuel pump. For example, a fuel controller may determine more accurate flow rates by sampling only a portion of transactions at the fuel pump. In this regard, the fuel controller may filter out portions of a particular transaction that are unlikely to represent the maximum flow rate (e.g., the beginning and end portions) as well as entire transactions where the maximum flow rate may never have been reached (e.g., small volume transactions). Thus, advantageous embodiments allow monitoring to be based on more accurate information than would be provided by including data from every fuel pump transaction and from start to finish. In certain advantageous embodiments, a user may be provided with more frequent updates on the status of a fuel pump and its components than a typical system. For example, a user may receive real time or hourly information about the fuel pump rather than a more typical daily or weekly report. In yet other advantageous embodiments, information about the fuel pump may be provided to external sources for real time aggregation. For example, a fuel controller and/or site controller may provide fuel pump information to a web host external to an individual store point-of-sale system. In this way, data and alerts related to multiple stores may be aggregated and reported to a user on a frequent basis.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method for evaluating fuel pump information comprising:

receiving, by executable instructions that execute on a hardware processor from a non-transitory computer-readable storage medium as a site controller, fuel pump information associated with a fuel pump by at least sampling portions of each of a plurality of fuel transactions for receiving some of the fuel pump information, wherein sampling further includes ignoring an initial portion of each fuel transaction that represents a first gallon of fuel being pumped and ignoring an ending portion of each fuel transaction that represents any fuel being pumped that exceeds three gallons of fuel;

updating, by the site controller, previous fuel pump information associated with the fuel pump based on the received fuel pump information;

detecting, by the site controller, an alarm condition associated with the fuel pump based at least in part on the updated fuel pump information; and providing, by the site controller, the alarm condition to a device as an indication that the fuel pump requires service based on the alarm condition.

2. The method of claim 1, wherein the fuel pump information comprises information selected from the group consisting of fuel pump flow rate, fuel transaction cancellations, help button presses, card read errors, and printer errors.

3. The method of claim 1, wherein the previous fuel pump information comprises an average value of previously received fuel pump information associated with the fuel pump, and wherein updating the previous fuel pump information comprises updating the average value with the received fuel pump information.

4. The method of claim 3, wherein the alarm condition indicates a condition selected from the group consisting of the average value exceeding a threshold and the average value falling below a threshold.

5. The method of claim 1, wherein the previous fuel pump information comprises a combined value of previously received fuel pump information associated with the fuel pump, and wherein updating the previous fuel pump information comprises updating the combined value with the received fuel pump information.

6. The method of claim 5, wherein the alarm condition indicates that the combined value exceeds a maximum acceptable value.

7. The method of claim 1, further comprising:
- providing, by the site controller, for transmission of an alert comprising an indication of the alarm condition.

8. The method of claim 7, further comprising:
- monitoring, by the site controller, the elapsed time from transmission of the alert; and
- generating, by the site controller, a second alarm condition in an instance in which the elapsed time exceeds a threshold and the alarm condition associated with the alert has not been resolved.

9. An apparatus for evaluating fuel pump information comprising:
- at least one processor; and
- at least one memory comprising computer program code, the at least one memory and the computer program code representing executable code for a site controller that is configured to execute on the at least one processor and cause the apparatus at least to:
- receive fuel pump information associated with a fuel pump by at least sampling portions of each of a plurality of transactions at the fuel pump for some of the fuel pump information, wherein sampling further includes ignoring an initial portion of each fuel transaction representing a first gallon of fuel being pumped and ignoring an ending portion of each fuel transaction represents any fuel being pumped that exceeds three gallons of fuel;
- update previous fuel pump information associated with the fuel pump based on the received fuel pump information;
- detect an alarm condition associated with the fuel pump based at least in part on the updated fuel pump information; and
- provide the alarm condition to a device as an indication that the fuel pump requires service based on the alarm condition.

10. The apparatus of claim 9, wherein the fuel pump information comprises information selected from the group consisting of fuel pump flow rate, fuel transaction cancellations, help button presses, card read errors, and printer errors.

11. The apparatus of claim 9, wherein the previous fuel pump information comprises an average value of previously received fuel pump information associated with the fuel pump, and wherein updating the previous fuel pump information comprises updating the average value with the received fuel pump information.

12. The apparatus of claim 11, wherein the alarm condition indicates a condition selected from the group consisting of the average value exceeding a threshold and the average value falling below a threshold.

13. The apparatus of claim 9, wherein the previous fuel pump information comprises a combined value of previously received fuel pump information associated with the fuel pump, and wherein updating the previous fuel pump information comprises updating the combined value with the received fuel pump information.

14. The apparatus of claim 13, wherein the alarm condition indicates that the combined value exceeds a maximum acceptable value.

15. The apparatus of claim 9, wherein the site controller is configured to cause the apparatus to:
- provide for transmission of an alert comprising an indication of the alarm condition.

16. The apparatus of claim 15, wherein the is the site controller is further configured to cause the apparatus to:
- monitor the elapsed time from transmission of the alert; and
- generate a second alarm condition in an instance in which the elapsed time exceeds a threshold and the alarm condition associated with the alert has not been resolved.

17. A method for determining a fuel pump flow rate comprising:
- receiving, by executable instructions that execute on a hardware processor from a non-transitory computer-readable storage medium as a site controller, a first fuel volume update associated with a fuel transaction;
- receiving, by the site controller, a second fuel volume update associated with the fuel transaction, wherein the first fuel volume update and second fuel volume update are sampled from the fuel transaction and the first fuel volume is sampled after an initial portion of fuel is dispensed by ignoring the initial portion that represents a first gallon of fuel being pumped and the second fuel volume is sampled before an ending portion of fuel is dispensed by ignoring the ending portion that represents fuel pumped in excess of three gallons, and excluding the fuel transaction that includes less than a predetermined threshold of volume of dispensed fuel;
- determining, by the site controller, an elapsed time between the first fuel volume update and the second fuel volume update;
- determining, by the site controller, a flow rate of the fuel pump based at least in part on the first and second fuel volume updates and the elapsed time; and
- providing, by the site controller, an alarm condition to a device indicating that the fuel pump requires service based at least in part on the flow rate.

18. The method of claim 17, wherein the first fuel volume update corresponds to a fuel volume greater than a first fuel volume threshold.

19. The method of claim 17, wherein the second fuel volume update corresponds to a fuel volume less than a second fuel volume threshold.

20. The method of claim 17, further comprising:
- receiving, by the site controller, a third fuel volume update associated with the fuel transaction in an instance in which the second fuel volume update is determined to contain errant information;
- wherein determining the elapsed time comprises determining the elapsed time between the first fuel volume update and the third fuel volume update, and wherein determining a flow rate of the fuel pump comprises determining the flow rate of the fuel pump based at least in part on the first and third fuel volume updates and the elapsed time.

* * * * *